United States Patent
Turner et al.

(10) Patent No.: US 8,448,653 B2
(45) Date of Patent: May 28, 2013

(54) SPRAY-TYPE CAR WASH SYSTEM WITH BREAKAWAY SPRAY ARMS

(75) Inventors: Barry S. Turner, Novi, MI (US); Thomas E. Weyandt, Northville, MI (US); Michael Belanger, Novi, MI (US)

(73) Assignee: Belanger, Inc., Northville, MI (US)

( * ) Notice: Subject to any disclaimer, the term of this patent is extended or adjusted under 35 U.S.C. 154(b) by 89 days.

(21) Appl. No.: 13/025,447

(22) Filed: Feb. 11, 2011

(65) Prior Publication Data
US 2011/0277797 A1   Nov. 17, 2011

Related U.S. Application Data

(60) Provisional application No. 61/333,480, filed on May 11, 2010.

(51) Int. Cl.
*B60S 3/04* (2006.01)
(52) U.S. Cl.
USPC ............ 134/123; 134/113; 134/198; 134/199
(58) Field of Classification Search
None
See application file for complete search history.

(56) References Cited

U.S. PATENT DOCUMENTS

| | | | |
|---|---|---|---|
| RE40,463 E * | 8/2008 | Belanger et al. | 134/34 |
| 7,438,075 B1 * | 10/2008 | Huntington et al. | 134/57 R |
| 2009/0147504 A1 * | 6/2009 | Teeters | 362/153 |
| 2009/0173366 A1 * | 7/2009 | Huntington et al. | 134/123 |

* cited by examiner

*Primary Examiner* — Michael Kornakov
*Assistant Examiner* — Ryan Coleman
(74) *Attorney, Agent, or Firm* — Young Basile Hanlon & MacFarlane PC (57) ABSTRACT

A car wash system comprising at least one rotatable spray arm depending from an overhead carriage. The arm is equipped with a detent-type compound breakaway knuckle which permits the arm to be displaced upwardly from a lowest potential energy orientation by disengaging the detent but thereafter permitting a smooth essentially unresisted movement whereby when the force tending to cause angular displacement and the arm is removed, the arm returns to the normal operating, low potential energy position. A shaker function or a high pressure spray burst may be used to complement the gravitational resetting function as needed.

10 Claims, 8 Drawing Sheets

SPRAY-TYPE CAR WASH SYSTEM WITH BREAKAWAY SPRAY ARMS

CROSS-REFERENCE TO RELATED APPLICATION

This application claims the benefit of U.S. provisional patent application Ser. No. 61/333,480 filed May 11, 2010, the contents of which are incorporated herein by reference.

FIELD OF THE INVENTION

The present invention relates to touchless automatic car wash systems having one or more spray arms which move about a vehicle and more particularly to a breakaway feature which allows an arm to be displaced from its normal orientation in the event of inadvertent contact with a vehicle or other object.

BACKGROUND OF THE INVENTION

Touchless automatic car wash installations using spray arms which direct multiple streams of washing and rinsing fluids toward the surfaces of a stationary vehicle are popular due in large part to the fact that they generally make no hard physical contact with the vehicle and generally take up less space than traditional conveyor washers. Touchless systems commonly utilize one or more spray arms which are dependingly mounted from an overhead carriage which can be programmed for movement forward and backward longitudinally relative to a wash bay while the arm or combinations of arms can be programmed to move around the vehicle. An example of such system is fully disclosed in U.S. Pat. No. Re 40,463 assigned to Belanger, Inc. of Northville, Mich.

One of the features of the system described in the aforementioned patent is a breakaway joint which allows a spray arm or a lower portion thereof to be non-destructively angularly displaced out of its normal operating orientation. This is accomplished by a set of ball-detent joints operating about axes at 90° angles to one another. A spring-biased ball can be displaced out of a shallow socket and onto a flat raceway surface having a sharp corner with another flat raceway surface. Sensors are provided to produce a signal in the event either of the two joints breaks.

The joint just described must ordinarily be manually reset; i.e., the force of gravity working on the arm is not usually sufficient to compress the bias spring enough to allow the ball to go back around the sharp corner between the raceway surfaces.

SUMMARY OF THE INVENTIONS

The invention described herein is a depending arm spray wash system comprising an overhead carriage, at least one spray arm attached to the carriage and equipped with nozzles for directing washing and rinsing fluids toward the exterior surfaces of a vehicle in a wash bay. In particular, the invention includes an improved breakaway feature which resets the breakaway joint to the normal operating condition without operator intervention after inadvertent contact between the arm and a vehicle or other object.

In general, this is accomplished in part by configuring the raceway adjacent the ball detent as a smoothly rounded, semi-cylindrical surface with no sharp corners over about 45° or more of arm displacement from the normal set position. Accordingly, gravity alone is often sufficient to reset the joint following a break.

In accordance with a preferred embodiment of the invention hereinafter described, the spray arm includes a resilient plastic sleeve or shell which transmits light and resists impact damage to itself or to an object contacted by it. The breakaway feature is provided in the form of a compound; i.e., two-axis, knuckle allowing a four-way breakaway action to occur. The joints can be provided with transducers to produce signals when a break occurs, which signals can be transmitted to a control station either to simply record the event or to take a remedial action hereinafter described, or both.

In the most preferred form, the resettable joint is complemented by a secondary function which can be called into action in the event a jointed arm fails to reset on is own. This function can be provided by either or both of at least two modes. In one mode, a break signal brings a "shaker" function into effect whereby several rapid reversals of the motor/gearbox which produces rotary motion of the jointed arm during a wash program are produced. In another mode, useful where the break is aligned with the spray nozzle emission direction, the nozzles may be briefly operated at high pressure to create a reaction force which pushes the arm toward a higher angle and then is rapidly cut off to allow the arm to fall toward its normal orientation.

These and other features of the invention may be best understood from a reading of the following description which is to be taken with the accompanying drawings.

BRIEF DESCRIPTION OF THE DRAWINGS

The various features, advantages and other uses of the present invention will become more apparent by referring to the following detailed description and drawing in which.

DETAILED DESCRIPTION OF THE ILLUSTRATIVE EMBODIMENT

Figure 1:
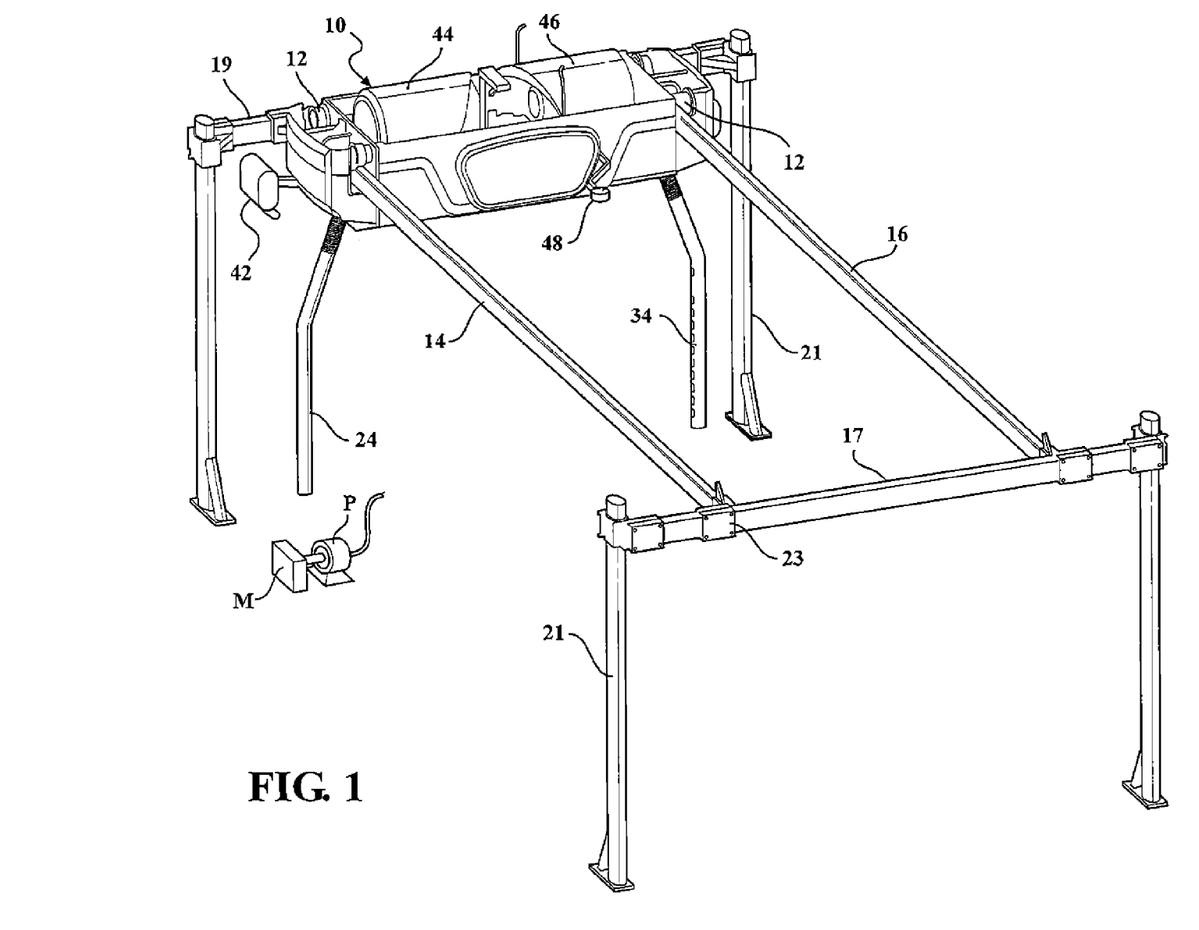
FIG. 1 is a perspective view of a spray-type car wash system using two spray arms depending mounted to an overhead carriage which, in turn, is mounted for travel along longitudinal rails.

Referring to the drawings, a rollover car wash system embodying the inventions generally described above comprises an overhead carriage 10 having four rollers 12 such that the carriage rests on and is movable by way of said rollers 12 along parallel overhead rails 14, 16. At least two of the rollers 12 are driven by a reversible electric motor operating through horizontal half-shafts (not shown) to provide controlled, programmed travel of the carriage 10 in the longitudinal direction. The rails 14, 16 are attached by adjustable brackets 23 to cross beams 17, 19 which in turn are supported by vertical posts 21. The height of the posts 21 and the length of the cross rails 17, 19 is such as to define a wash bay which is large enough to receive vehicles of the type to be washed; e.g., passenger cars, SUVs, light trucks and the like. While the dimensions of the structure may be chosen to suit the application, a system to wash passenger cars may be about 25 feet in length.

Attached to the carriage by gears (not shown) and disposed essentially immediately under the carriage 10 are horizontal left and right arms 18, 20 which can be driven in mirror image directions by a motor (not shown) as is more fully described in the aforesaid U.S. Pat. No. Re 40,463, the disclosure of which is incorporated herein by reference. Attached to and depending from the outer ends of the arms 18, 20 are generally vertically depending spray arms 24, 34, which are attached to the horizontal arms 18, 20, respectively by breakaway knuckles 22, 36 hereinafter described in greater detail. While a two-arm system is useful in describing a practical embodiment of the invention, it is to be understood that all aspects of the breakaway joint can also be used in a single arm system.

Figure 3:
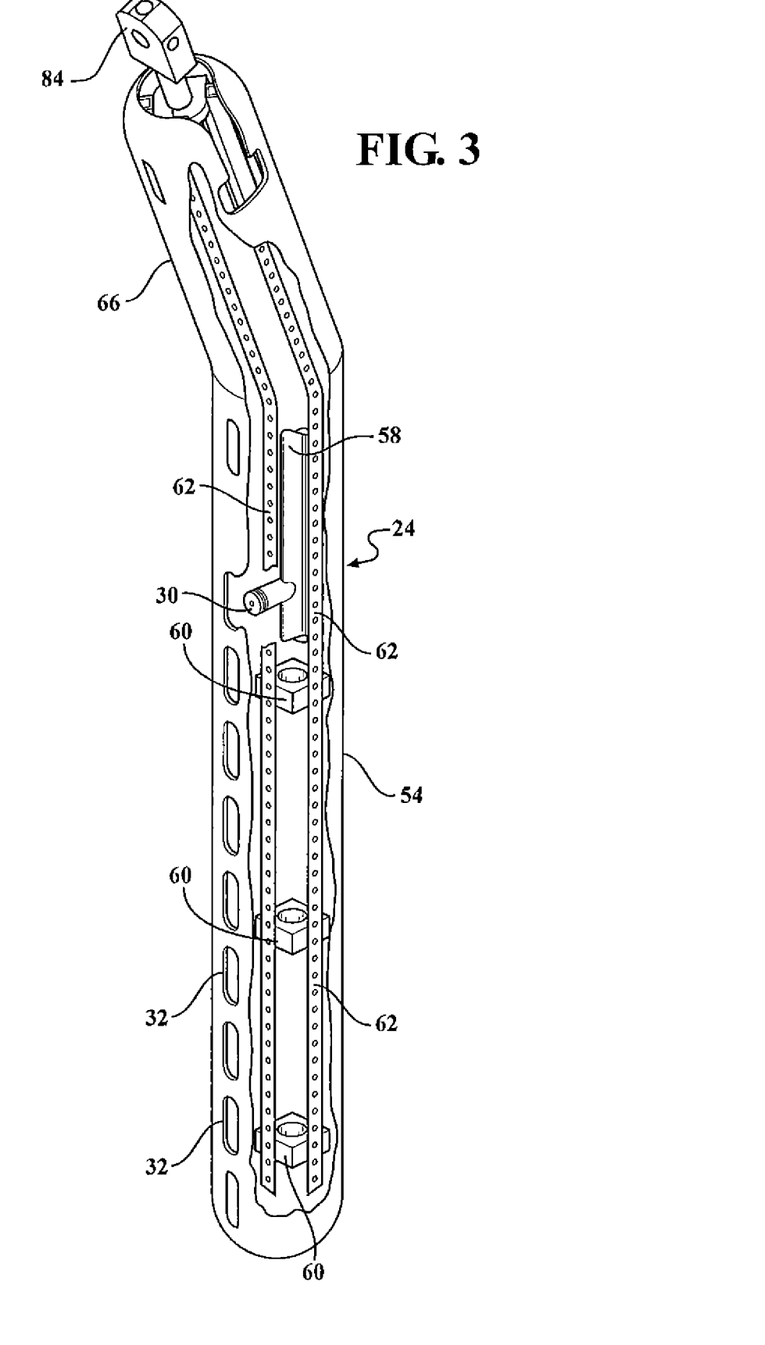
FIG. 3 is a perspective view of a spray arm constructed in accordance with the invention with parts broken away to show interior details.
Figure 8:
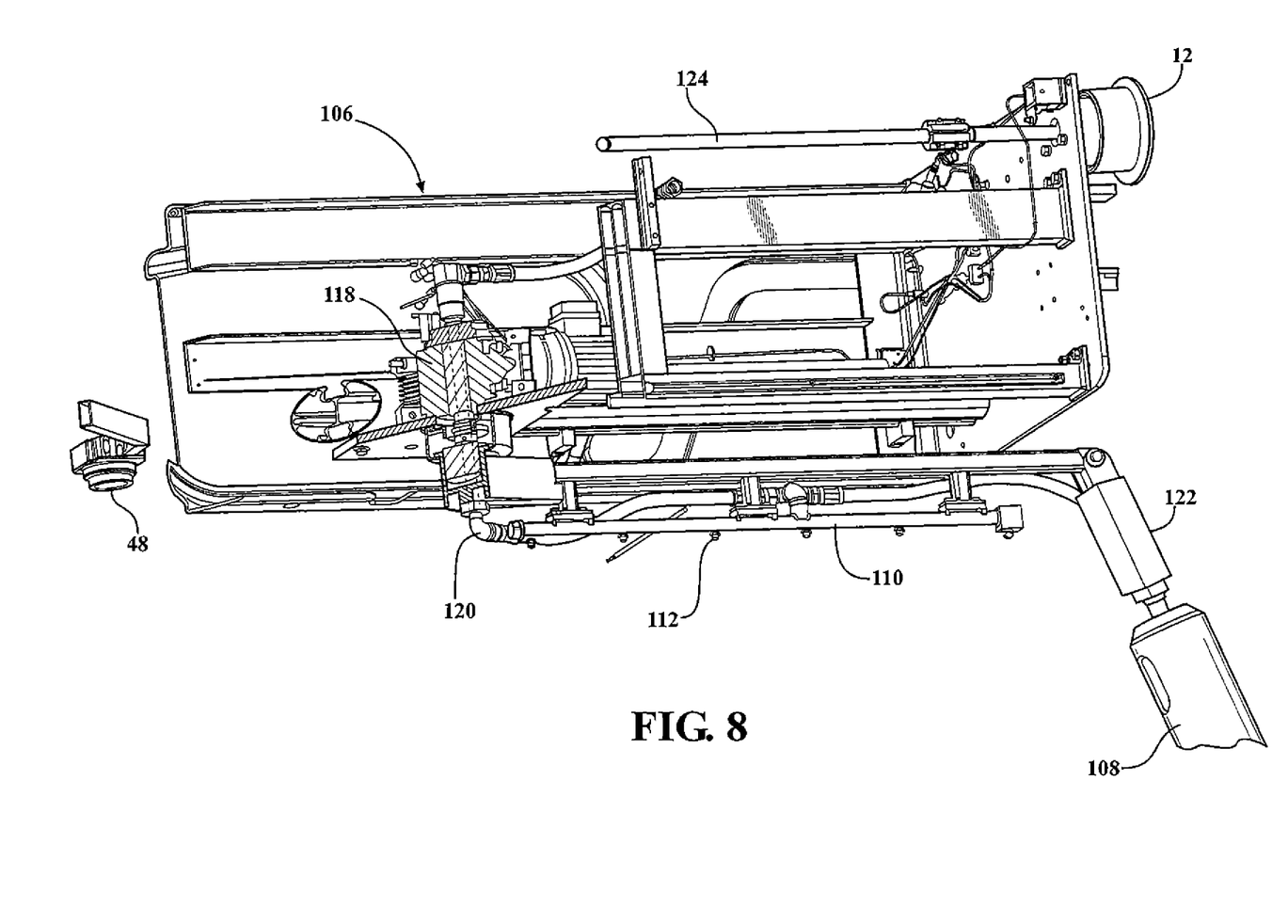
FIG. 8 illustrates a mechanism for rotating and supplying fluids to a single arm.

Arm 24, which will be taken as representative, has an upper portion 26 which is angled approximately 20° from vertical and a lower portion 28 which is fully contiguous with the upper portion 22. Similarly, arm 34 has an upper portion 35 and a lower portion 40. The upper and lower portions, as well as the horizontal arms 18, 20, all carry a fluid delivery conduit 58 having attached to it spray nozzles 30 which are effective to direct streams or jets of different washing and rinsing fluids toward the exterior surface of an automobile at selected pressures according to the speed of a multi-speed pump P driven by motor M. The nozzles 30 are arranged along the arms 24, 34 to coincide with elongate slots 32 which are formed in the side surfaces of plastic sleeves 54 which form part of each of the depending arms 24, 34 as best shown in FIG. 3. The inwardly angled upper portions 26, 35 of the depending arms 24, 34 are preferred for the reason that most passenger cars are narrower at the top or roof line than they are across the lower body and the inwardly-angled transition portions 26, 35 conserve material and place the nozzles in those portions closer to the vehicle. However, a 90° transition between the horizontal arms 18, 20 and depending arms 24, 34 can also be used. In addition, the nozzles may be moved from the horizontal arms 18, 20 to fixed structures beneath the carriage 10 or mounted on a horizontal manifold 110 as shown in FIG. 8. The sleeves 54 may, for example, be about 6 to 8 inches in diameter.

The carriage 10 carries foam dispensers 42 on both sides aimed downwardly and inwardly toward a vehicle between the arms and spaced one or two feet ahead of the arms so as to avoid interference with the spray pattern. Scroll-type blowers 44, 46 are mounted in the overhead carriage 10 with outlets (not shown) directed downwardly to remove water droplets from a washed vehicle. Additional blowers (not shown) may be mounted to the sides of the vertical posts 21 at the exit end of the bay to dry the sides of the vehicle as shown in U.S. Pat. No. RE 40,463 assigned to Belanger, Inc., also incorporated herein by reference. The nature and construction of the blowers 44, 46 is more fully described in the co-pending application Ser. No. 11/687,723 filed Mar. 19, 2007 and assigned to Belanger, Inc. The content of that pending application is incorporated herein by reference.

In addition, downwardly aimed ultrasonic sensors 48 are mounted on outwardly extending arms on both front and rear of the carriage 10 (only the front sensor 48 is shown) to serve multiple purposes including (a) the generation of signal detecting the presence of the vehicle in the bay thereby to initiate a wash sequence only if a vehicle is present, and (b) working with a longitudinal translation of the carriage before a wash program begins to locate the forward and rear ends of the vehicle where programming means are also provided to modify the degree or extent of longitudinal travel of the carriage 10 during the washing and rinsing operations. This feature is provided where desired in recognition of the fact that commercially available passenger vehicles vary substantially in length and it is desirable for purposes of economy to spray chemical/fluids only when a portion of the vehicle is in the target area.

Figure 2:
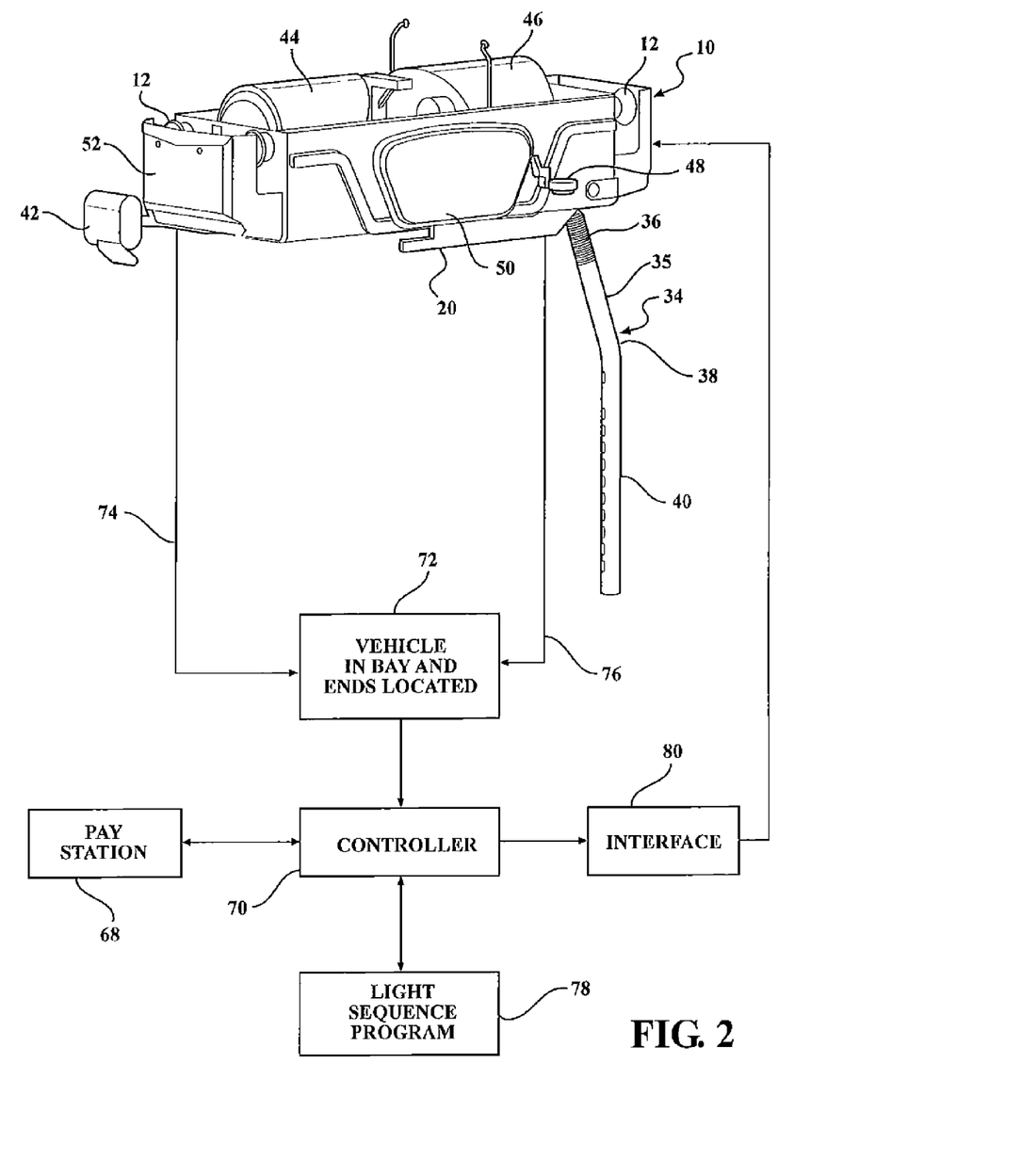
FIG. 2 is another perspective view of the system of FIG. 1 minus the carriage support rails but further indicating, schematically, a system control layout.

A lighted logo panel 50 is provided on the front surface of the carriage 10 as best shown in FIGS. 1 and 2. Cabinet doors 52 are provided on the lateral sides of the carriage 10 if desired to afford access to machinery components. The carriage is, of course, supplied with electricity and fluids (water with suitable chemicals) by conduits and cables (not shown) but well known to persons skilled in the car was construction all.

Figure 4:
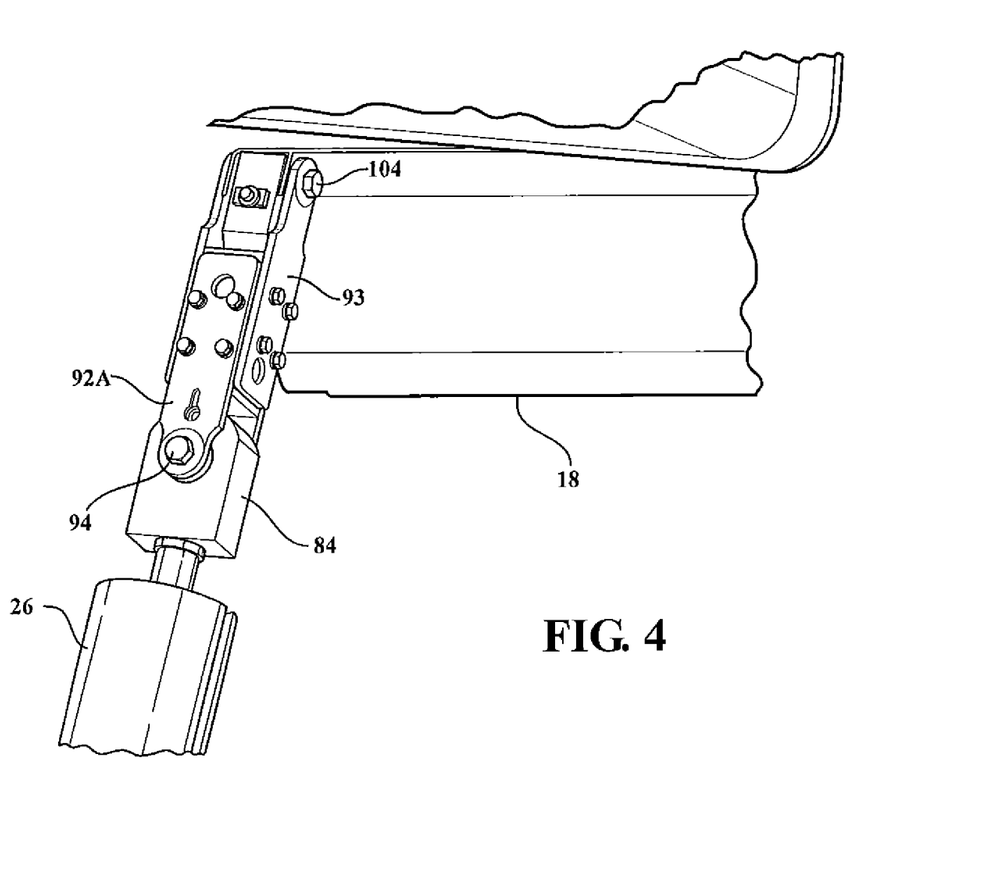
FIG. 4 is a perspective view of a breakaway knuckle in accordance with the invention.
Figure 5:
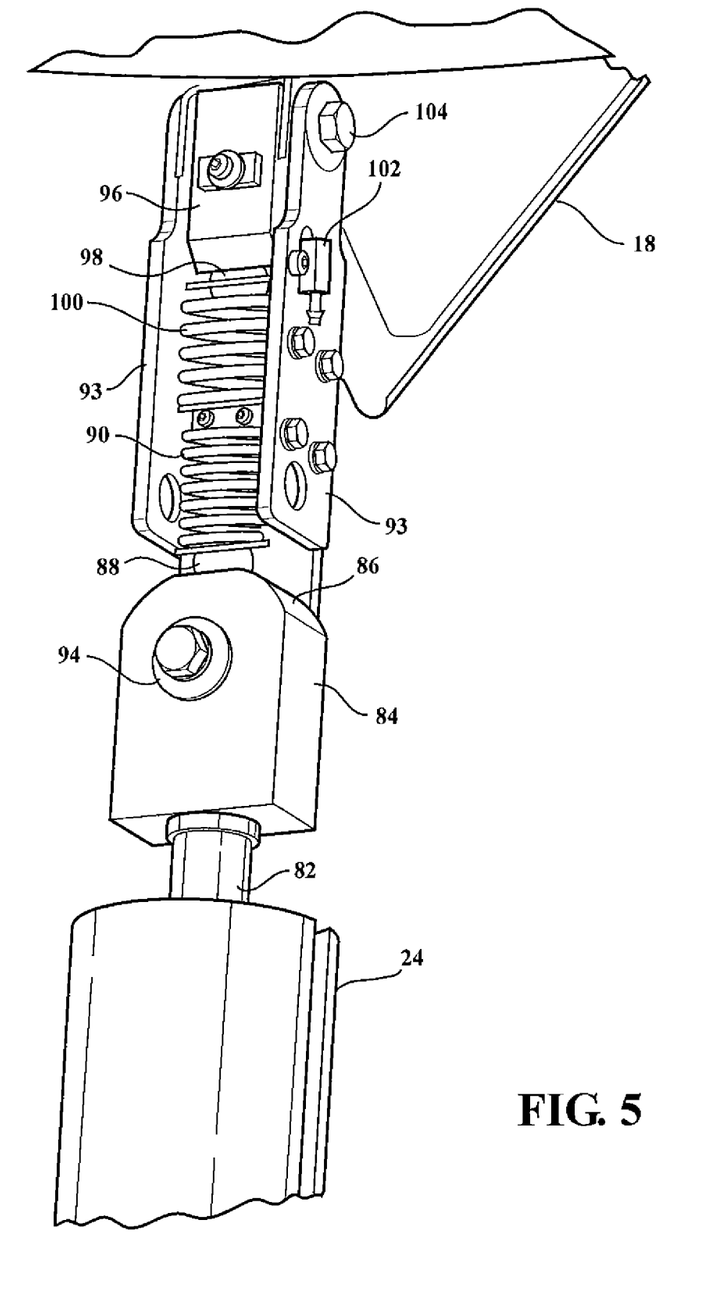
FIG. 5 is similar to FIG. 4 but shows interior mechanical details of a compound breakaway feature for a spray arm in the system of FIG. 1.
Figure 6:
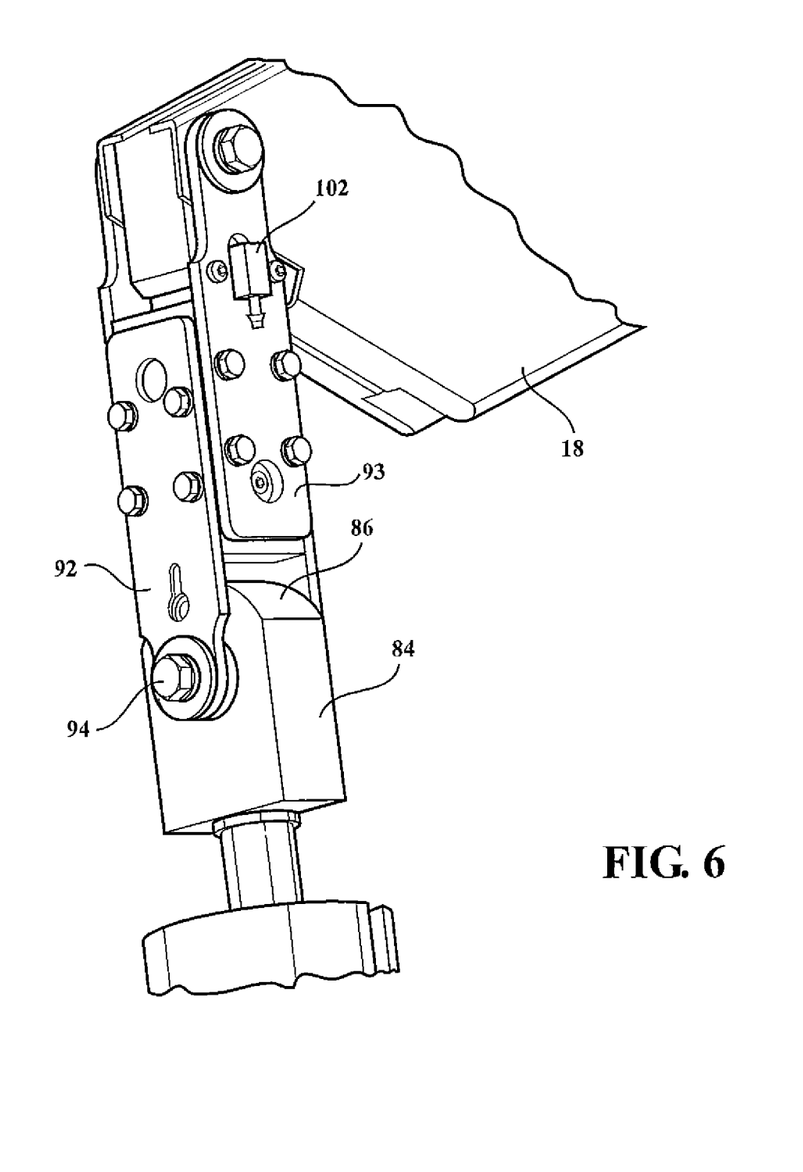
FIG. 6 is another view of the compound breakaway feature of FIG. 5.

As best shown in FIGS. 3 and 4, each arm is provided with an outer plastic casing or sleeve 54 with an upper portion 66 made of a translucent plastic and of sufficient wall thickness to provide shape retention but thin enough and with enough resilience to afford some "give" if it inadvertently makes contact with a vehicle. The preferred plastic is HDPE with an EVA content to give the sleeve resilience and to reduce or eliminate the brittleness normally associated with harder PVC plastics that are used, for example, to construct water pipes. The sleeve resists impact damage because it is resilient. It also protects the internal components of each arm from damage. Finally, it transmits light. For all of these reasons, the resilient sleeve is preferable to opaque cushioning in this embodiment. The plastic of the sleeves 54, at least in the lower portions, can be clear but preferably exhibits a neutral or milky translucence so that light from LED strips 62 hereinafter described can be seen through it. The preferred process for making the sleeves is rotational molding. The fact that the arms 24, 34 are described as light and is exemplary, as the knuckle described herein can be used to full advantage with unlighted arms as well.

The structure of FIGS. 3 and 4 comprises a plurality of longitudinally spaced aluminum bulkhead blocks 60 on which are mounted LED strips 62 containing red, green and blue LEDs which are wired such that the LEDs can be illuminated in single colors or in combinations to produce various shades of color through the translucent plastic of the sleeve 24. A fluid supply pipe or conduit 58 runs down through the center of the bulkhead 60 to supply fluids to nozzles 30. The overall operation and/or function of the LED strips 62 is more fully described in the co-pending application, U.S. application Ser. No. 13/025,432 filed concurrently herewith.

Turning to FIG. 2 of the drawings, the carriage 10 together with the depending arms 24, 34 are shown in combination with components which make up an operating system to take maximum advantage of the lighting effect which is produced by the combination of the light strips 62 within the interior of the cylindrical plastic sleeves which make up the outer skins of the arms 24, 34. These components comprise a pay station 68 which serves the function of initiating the system by accepting an input representing the appearance and willingness of a customer to utilize the system. The pay station 68 may comprise a coin or bill or token receiver or a keyboard and may be wholly or partly remote from the wash bay, depending on whether the enterprise employing the invention is to be operated with or without attendant participation.

The pay station 68 produces electrical signals which are communicated to a controller 70 which may be a microcontroller or microprocessor having a memory 78 into which both a light sequence program and one or more systems operations sequences are stored. The system further comprises a "vehicle-in-bay" signal generator 72 connected to the carriage 10 by way of signal lines 74 to provide signals from, for example, a treadle or electric eye or, preferably from one or both of the downward looking ultrasonic sensors 48 which detect the presence of a vehicle in the bay. The sensors 48 also find the ends of the vehicle by traveling from one end of the rails 14, 16 to the other and programming the length of carriage movement during the wash sequence. This information is fed to controller 70. In short, it is undesirable to activate the system with no vehicle present even though the pay station 68 may indicate the arrival of a customer. It is desirable to activate the system when a vehicle is in the bay and to determine its overall length so travel of the carriage 10 can be correspondingly programmed. A data line 76 comes from the carriage sensors 58 to the generator 72 which communicates with controller 70.

The controller 70 is connected to an interface module 80 which may take the form of the interface described in U.S. Pat. No. 5,883,816, the content of which is incorporated herein by reference. The outputs of the interface 80 at the necessary power levels are connected to the various operating components of the carriage 10 including the aforementioned motors, solenoids, valves and pumps as necessary to make up an operating system.

A method of light sequence programming represented by the stored content of the memory 78 may be as follows:

(a) The output of a signal from the pay station 68 to the controller 70 signals the system that a vehicle is ready to approach. As a result, the light strips 62 in the interiors of the arms 24, 34 are illuminated so as to produce a first lighting effect indicating to the approaching driver that the car wash system is alive and functional and ready to receive his or her automobile. For example, the arms may be brought closely together to form a centerline target and illuminated with a flashing light to guide drivers into the center of the bay. The lighting of the depending arms 24, 34 thus serves a navigational purpose in giving the driver a strong visual cue to position his or her vehicle essentially centrally in the bay and as far forward as necessary to be within the envelope of arm movement;

(b) Once the vehicle is in position, the vehicle-in-bay signal on line 74 is produced to module 72 and the controller summons the next step in the light program to change the condition of the lights in the arms 24, 34 to a second, different lighting effect and, at the same time, to start the functional sequence of the mechanical car wash system. This may, for example, involve causing the carriage 10 to move forward and back to find the front and rear ends of the vehicle by sensors 48 and also beginning the washing operation by activating the spray nozzles 30. The lighting during this phase may assume a different color or proceed to a blinking or flashing condition or both;

(c) The controller 70 continues to cause the apparatus of the system to progress through the sequence of washing functions, the next of which is to create a high pressure spray from the nozzles 30, to cause longitudinal movement of the carriage 10 and also to pivot the arms 24, 34 around the ends of the vehicle to direct the high pressure spray of washing fluid (soap and water) at the outer surfaces of the vehicle. The lights may flash at a different rate or a different color or assume a new steady state color during this phase;

(d) The controller advances the wash cycle to the next step which, in this case, involves terminating the high pressure soap application and proceeding to a rinse operation. The program in memory 78 causes the lights to again change condition either by changing the blinking rate, eliminating the blinking rate and/or changing color;

(e) The system progresses to a drying phase by activating blowers 44, 46 and any side blowers which are present; and (f) With all operations concluded, the program stored in the memory 78 again alters the condition of the lighting system to communicate to the driver of the vehicle being washed, rinsed and dried, that the overall sequence has been concluded. Note that any fixed dryer blowers may stay on for a time as the vehicle exits.

Referring now to FIGS. 4, 5, 6, and 7, a four-way breakaway joint which is located between the upper arm portion 26 and the horizontal arm 18 will be described as representative of an identical breakaway joint on the opposite arms. While the previous part of this disclosure is directed primarily to a system having two reversely similar spray arms 24, 34, it is to be understood that the invention described herein is equally applicable to a system having a single arm which circumnavigates the vehicle.

As shown in FIGS. 4, 5, 6 and 7, the upper portion of the vertical spray manifold 82 is connected to a detent block 84 of steel having a smooth, arcuate detent ball raceway 86 formed in the top surface thereof. The smooth raceway is semi-cylindrical and symmetrical for about 45°-50° of breakaway arm movement on each side with no sharp corners or shoulders. The block 84 has a center pivot 94 which allows the entirety of the arm below the pivot 94 to be easily angularly displaced if inadvertent contact with a vehicle occurs. Ball 88 rests in the detent socket 87 and is urged into position by a spring 90 which is contained by structure between the clevis plates 92A and 92B. In this case, a second joint with clevis plates 93 is provided around pivot 104 above the aforementioned detent and comprises a round-shouldered upper detent block 96 operative in combination with a ball 98 urged into position in an appropriate socket by a spring 100. A sensor 102 is mounted on plate 93 and produces an electrical signal in the event of an angular re-orientation of the arm due to a joint break which signal may be conducted to controller 70 for appropriate processing as hereinafter described. Another sensor (not shown) is mounted on one of plates 92A and 92B to detect a break about the axis of pivot 94.

At least the lower detent is designed to be essentially self-resetting under ideal circumstances by virtue of the smooth arcuate raceway 86. If the arm inadvertently makes contact with a vehicle and is moved far enough to dislodge the ball 88 from the socket 87, the angular movement of the arm to a return position, once the interference is removed, is unresisted by anything other than gravitational force and the ball moves smoothly and progressively over the arcuate surface 86 to the degree necessary to accommodate the displacement. Once the inadvertent contact is removed, gravity often returns the arm 26 to the essentially vertical condition. The ball reseats itself in the socket 87, and the system remains functional without the necessity of attendant intervention.

While the joints shown may normally be self-resetting; i.e., the weight of the arm is sufficient to reseat the detent ball by gravity alone, cold weather, poor lubrication performance and/or other factors may prevent the resetting action from occurring. Under these conditions, referring to FIG. 9, the signal from the joint angle transducer 102 showing a "broken" joint is timed in the controller 70. If it persists for more than a predetermined interval, the motor/gearbox 116 (shown in FIG. 8) which produces the rotary function for the arm is activated in a series of quick, alternating-direction bursts to "shake" the arm into resetting. If this does not eliminate the "broken" signal, the shake function is stopped and operator intervention is required. Alternatively, the transducer signal can produce a burst of high pressure spray tending to push the broken arm higher by reaction torque. Once the spray is shut off, the arm may fall back into normal position.

Figure 7:
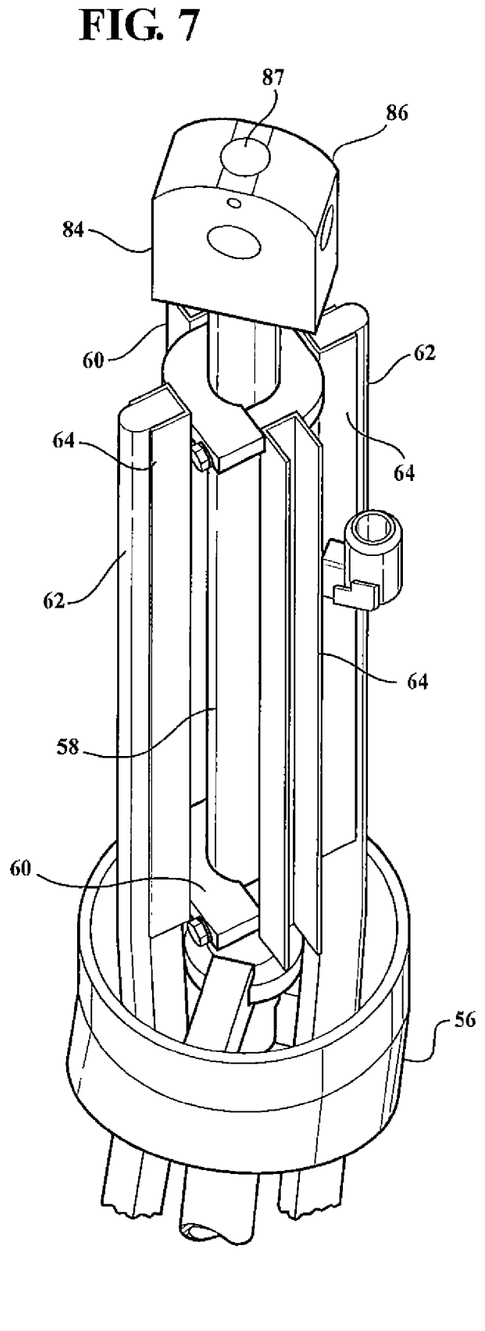
FIG. 7 is another perspective view of a spray arm showing the upper component of one of the two detent locks in a compound knuckle arrangement.

The upper joint represented by pivot 104 is at 90° angles relative to the joint 94 and provides protection when the arm is at the front of the vehicle. Its construction and function is the same as that of the lower joint except the ball 98 and detent block 96 are inverted and the swing axis is rotated 90° from that of the lower joint.

Summarizing, the effect of the breakaway feature described herein is to hold each of the arms 24, 34 in a normal operating orientation which is essentially vertical and, therefore, at the lowest potential energy position. Washing and rinsing fluids are normally delivered through the arms in this position irrespective of the lateral and/or longitudinal position of the arm or arms as directed by the control system of FIG. 2. However, in the event of inadvertent contact between a vehicle and one of the arms, a detent will breakaway allowing the arm to move in the direction of the applied force away from the normal operating orientation and away from the lowest potential energy position. Due to the smooth surface of the raceway adjacent the detent, minimal resistance is offered; i.e., only that resistance produced by the energy needed to lift the arm angularly away from the lowest energy position. Operation of the breakaway function may cause the controller to stop or pause the wash system and also trigger a blinking red light effect from the LEDs in the arm to give a warning to the driver. When a driver sees this inadvertent contact, stops and backs up to take the vehicle out of contact with the arm, gravity normally allows the arm to return to the operative, lowest energy position where the detent resets. Since the arm itself is highly damage-resistant by virtue of the resilient sleeve, and since the detent provides only minimal resistance to angular displacement, in most cases the arm which has been hit or contacted can continue to function in the normal fashion and in any event has returned to the operative position without attendant intervention. In the event the arm remains broken for longer than a design term, the "shaker" function is employed. A "break" signal can also be used to stop system operation; i.e., stop arm travel and/or to reverse arm travel for a short distance. This can be important where contact between the arm and a vehicle is the result of the vehicle being out of position. Continued arm motion can cause damage and must be avoided.

FIG. 8 shows partial detail of a carriage 106 for a system having a single spray arm 108, only a portion of which is shown. It will be understood that the details of arm 108 are the same as, for example, arm 24. A manifold 110 carries spray nozzles 112 for delivery of fluids to a vehicle being washed. The arm 108 carries additional nozzles in the fashion shown, for example, in FIG. 3. Rotation of the arm is produced by a motor and gearbox unit 116 through a joint 118 through which the fluid supply conduit 120 runs. The motor gearbox 116 can be activated by the controller 70 to jog forward and backward rapidly to shake the arm 112 in the event a breakaway function signal from unit 122 persists. FIG. 8 also shows part of the longitudinal drive system including a half-shaft 124 connected to drive roller 12. Additional detail can be found in co-pending applications, U.S. application Ser. Nos. 13/025,466 and 13/025,503 filed concurrently herewith, the entire contents of which are incorporated herein by reference.

Figure 9:
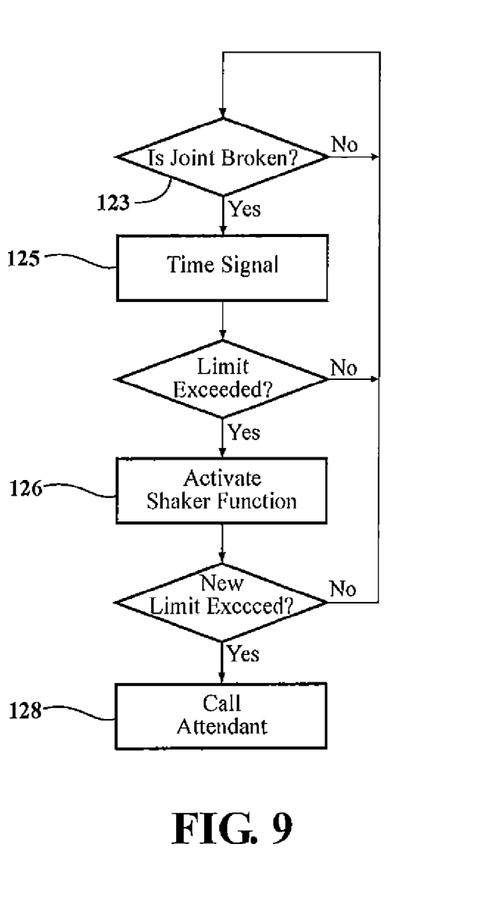
FIG. 9 illustrates a program for bringing the shaker function into effect.

FIG. 9 is a flowchart for a second program in controller 70. If the broken joint signal (block 123) exceeds the time limit set by clock function 125, a shaker function (or the high-pressure burst) is initiated at block 126 as described above. If this does not reset the arm and remove the signal, an attendant call function is initiated (128).

It will be understood that the system and the three inventive areas found generally therein has been described with reference to an illustrative embodiment and that the foregoing description is not to be construed as limiting the inventions.

What is claimed is:

1. A car wash system for installation in an area where vehicles are to be washed comprising;
an overhead support;
at least one spray arm having a fluid delivery system and being dependingly mounted to said overhead support in a normal vertical operating orientation where fluids can be delivered from the arm to a vehicle;
a drive for moving the arm; and
a breakaway knuckle associated with said spray arm to allow at least a portion thereof to be displaced angularly away from a normal vertical operating orientation about an axis, said knuckle comprising a follower surface and a spring-loaded ball normally residing in a detent in a position in said surface corresponding to the normal operating orientation, said surface being a surface for the detent ball to follow when the joint breaks away and moves said arm moves about said axis; said knuckle being free of reset springs operating in opposition to movement of said arm about said axis after the knuckle breaks away, whereby breakaway movement from the normal operating orientation while the detent ball is on said surface but not in said detent is resisted essentially only by gravity acting on said arm.

2. A system as described in claim 1 further comprising a sensor for producing a signal when the joint breaks away, and means for selectively applying a short-term force to the arm when said signal persists for a predetermined time period about said axis.

3. Apparatus as defined in claim 2 wherein the means for applying comprises a system for shaking the arm by intermittent reversing movements.

4. A car wash apparatus as defined in claim 2 wherein said means for applying comprises a system for producing a fluid spray burst from said arm.

5. A system as defined in claim 1 wherein the spray arm comprises a lighting system for producing vertically distributed illumination along said arm.

6. A system as defined in claim 5 wherein the lighting system comprises a hollow plastic sleeve wherein the plastic is translucent and the arm further contains a length of LEDs to produce illumination within the sleeve, which illumination is visible fully around said sleeve.

7. A system as defined in claim 6 wherein the LEDs are provided in multiple colors.

8. A car wash system comprising:
an overhead carriage support;
a carriage mounted on said support for programmed travel therealong;
a spray arm dependingly mounted to said carriage for movement relative to a vehicle while in a normal operating orientation; and
a two-axis breakaway knuckle between said arm and said carriage support to allow a breakaway of said arm to occur about each of two orthogonal axes, said knuckle including a pair of ball detent raceways each having a detent to receive a detent ball in a position corresponding to said normal operating orientation, and wherein the knuckle comprises a raceway for a ball to follow during arm displacement about one of said axes after breakaway, said knuckle being free of reset springs that resist arm displacement about one of said axes after breakaway from the normal operating orientation whereby the return to said normal operating orientation is produced substantially entirely by gravity.

9. A system as defined in claim 8 wherein said knuckle comprises two adjacent joints, each of which includes a single ball-detent and detent spring wherein the detent has a generally semi-cylindrical raceway portion over which the ball travels when the arm is displaced away from the normal operating orientation.

10. A system as defined in claim 8 wherein the spray arm comprises a horizontal portion and a vertical portion, the horizontal portion being pivotally attached to the carriage at one end and to the vertical portion at the other end, said knuckle being located between the horizontal and vertical portions whereby only the vertical portion breaks away.

\* \* \* \* \*